(12) United States Patent
Gebhardt et al.

(10) Patent No.: US 10,937,080 B2
(45) Date of Patent: *Mar. 2, 2021

(54) SYSTEM AND METHOD FOR IDENTIFYING TRUE CUSTOMER ON WEBSITE AND PROVIDING ENHANCED WEBSITE EXPERIENCE

(71) Applicant: Airbnb, Inc., San Francisco, CA (US)

(72) Inventors: Richard A. Gebhardt, Durham, NC (US); ChunHui Y. Higgins, Raleigh, NC (US); William P. Higgins, Durham, NC (US); Christopher A. Maul, Wake Forest, NC (US); Deanna M. Shaw, San Martin, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,189

(22) Filed: Sep. 14, 2018

(65) Prior Publication Data

US 2019/0012720 A1 Jan. 10, 2019

Related U.S. Application Data (63) Continuation of application No. 14/940,757, filed on Nov. 13, 2015, now Pat. No. 10,127,597.

(51) Int. Cl.
*G06Q 30/00* (2012.01)
*G06Q 30/06* (2012.01)
*H04L 29/08* (2006.01)

(52) U.S. Cl.
CPC ......... *G06Q 30/0631* (2013.01); *H04L 67/02* (2013.01); *H04L 67/10* (2013.01); *H04L 67/22* (2013.01)

(58) Field of Classification Search
None
See application file for complete search history.

(56) References Cited

U.S. PATENT DOCUMENTS

| 2006/0155605 A1 | 7/2006 | Haighton et al. |
| 2012/0072264 A1* | 3/2012 | Perna ................. G06Q 30/0201 705/7.32 |

(Continued)

OTHER PUBLICATIONS

IBM "List of IBM Patents or Patent Applications Treated as Related; (Appendix P)", Filed Sep. 14, 2018; 2 pages.

*Primary Examiner* — Mila Airapetian
(74) *Attorney, Agent, or Firm* — Schwegman Lundberg & Woessner, P.A.

(57) ABSTRACT

A method for identifying a user of a website as a potential customer and presenting the potential customer with enhanced website content includes: identifying that a user has landed on the website; identifying a user traffic-source; determining if the identified traffic-source matches a traffic-source in a list of customer-based reference traffic-sources; identifying a specific user behavior pattern on the website; determining if the identified specific user behavior pattern matches a behavior pattern from a list of customer-based reference behavior patterns; identifying the user as a potential customer if the identified traffic-source matches a traffic-source in a list of reference traffic sources and the identified specific user behavior pattern matches a behavior pattern from a list of reference behavior patterns; and displaying enhanced content tailored to the potential customer based upon the specific user behavior pattern or excluding display of enhanced content to the user if not a potential customer.

20 Claims, 5 Drawing Sheets

(56) References Cited

U.S. PATENT DOCUMENTS

| | | | |
|---|---|---|---|
| 2013/0054376 A1* | 2/2013 | Ross | G06Q 30/0251 |
| | | | 705/14.66 |
| 2013/0060610 A1 | 3/2013 | McGurk | |
| 2013/0325525 A1* | 12/2013 | Boyd, Jr. | G06Q 10/02 |
| | | | 705/5 |
| 2015/0269642 A1* | 9/2015 | Cai | G06Q 30/0613 |
| | | | 705/14.49 |
| 2015/0379602 A1* | 12/2015 | Gupta | G09C 1/00 |
| | | | 705/26.43 |
| 2016/0357808 A1* | 12/2016 | Morris | G06F 9/453 |
| 2017/0053288 A1* | 2/2017 | Golden | H04L 67/02 |
| 2017/0078415 A1 | 3/2017 | Wang et al. | |
| 2017/0140453 A1 | 5/2017 | Gebhardt et al. | |

\* cited by examiner

FIG. 5 ic customer and presenting the potential customer with enhanced website content. The method includes: identifying, by a processor, that a user has landed on the website; identifying, by the processor, a traffic source of the user; determining, by the processor, if the identified traffic source matches a traffic source in a list of customer-based reference traffic sources; identifying, by the processor, a specific user behavior pattern on the website; determining, by the processor, if the identified specific user behavior pattern matches a behavior pattern from a list of customer-based reference behavior patterns; identifying, by the processor, the user as a potential customer if (a) the identified traffic source matches a traffic source in a list of customer-based reference traffic sources and (b) the identified specific user behavior pattern matches a behavior pattern from a list of customer-based reference behavior patterns; identifying, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and displaying, by the processor, enhanced content tailored to the potential customer based upon the specific user behavior pattern; or excluding, by the processor, the non-potential customer from being displayed enhanced content.

SYSTEM AND METHOD FOR IDENTIFYING TRUE CUSTOMER ON WEBSITE AND PROVIDING ENHANCED WEBSITE EXPERIENCE

DOMESTIC PRIORITY

This application is a continuation application of the legally related U.S. Ser. No. 14/940,757 filed Nov. 13, 2015, the contents of which are incorporated by reference herein in their entirety.

BACKGROUND

The present invention relates to identifying a true potential customer using a website, and more specifically, to distinguishing the true potential customer from a user who may not be a potential customer and presenting an enhanced website experience based on a website behavior pattern of the true potential customer.

SUMMARY

Disclosed is a method for identifying a user of a website as a potential customer and presenting the potential customer with enhanced website content. The method includes: identifying, by a processor, that a user has landed on the website; identifying, by the processor, a traffic source of the user; determining, by the processor, if the identified traffic source matches a traffic source in a list of customer-based reference traffic sources; identifying, by the processor, a specific user behavior pattern on the website; determining, by the processor, if the identified specific user behavior pattern matches a behavior pattern from a list of customer-based reference behavior patterns; identifying, by the processor, the user as a potential customer if (a) the identified traffic source matches a traffic source in a list of customer-based reference traffic sources and (b) the identified specific user behavior pattern matches a behavior pattern from a list of customer-based reference behavior patterns; identifying, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and displaying, by the processor, enhanced content tailored to the potential customer based upon the specific user behavior pattern; or excluding, by the processor, the non-potential customer from being displayed enhanced content.

Also disclosed is a system for identifying a user of a website as a potential customer and presenting the potential customer with enhanced website content. The system includes a memory having computer readable instructions and a processor for executing the computer readable instructions. The computer readable instructions include: identifying, by the processor, that a user has landed on the website; identifying, by the processor, a traffic source of the user; determining, by the processor, if the identified traffic source matches a traffic source in a list of customer-based reference traffic sources; identifying, by the processor, a specific user behavior pattern on the website; determining, by the processor, if the identified specific user behavior pattern matches a behavior pattern from a list of customer-based reference behavior patterns; identifying, by the processor, the user as a potential customer if (a) the identified traffic source matches a traffic source in a list of customer-based reference traffic sources and (b) the identified specific user behavior pattern matches a behavior pattern from a list of customer-based reference traffic sources and (b) the identified specific user behavior pattern matches a behavior pattern from a list of customer-based reference behavior patterns; identify, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and display enhanced content tailored to the potential customer based upon the specific user behavior pattern; or exclude the non-potential customer from being displayed enhanced content.

Further disclosed is a computer program product for identifying a user of a website as a potential customer and presenting the potential customer with enhanced website content. The computer program product includes a computer readable storage medium having program instructions embodied therewith. The program instructions executable by a processor to cause the processor to: identify that a user has landed on the website; identify a traffic source of the user; determine if the identified traffic source matches a traffic source in a list of customer-based reference traffic sources; identify a specific user behavior pattern on the website; determine if the identified specific user behavior pattern matches a behavior pattern from a list of customer-based reference behavior patterns; identify the user as a potential customer if (a) the identified traffic source matches a traffic source in a list of customer-based reference traffic sources and (b) the identified specific user behavior pattern matches a behavior pattern from a list of customer-based reference behavior patterns; identify, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and display enhanced content tailored to the potential customer based upon the specific user behavior pattern; or exclude the non-potential customer from being displayed enhanced content.

DETAILED DESCRIPTION

Embodiments described herein are directed system and method for identifying a true potential customer using a website. The true potential customer is one who is visiting the website with the intention of potentially purchasing an offering of the website if the offering provides a solution for which the true potential customer is searching. Distinguishable from the true potential customer are non-customer users of the website who have no intention of purchasing an offering of the website. An example of a non-customer user is an employee related to the subject matter of the website who visits the website as part of his or her employment. The non-customer employee user may visit the website to inspect the operation of the website and determine the customer experience being provided at that time for example. Once a true customer is identified, the website may present an enhanced experience based on a behavior pattern of the true customer.

The true potential customer (TPC) may be identified by the traffic source from which the TPC traveled to the website and by matching behavior of the TPC to one of various behavior patterns that TPCs are found to follow. Non-limiting embodiments of traffic sources for TPCs include a search engine, a response to an email campaign, a response to a paid advertisement such as on broadcast media or magazines, a response to a webinar, and a response to a live event such as a fair or concert. In contrast, a non-customer user would not be expected to use these types of traffic sources.

Figure 1:
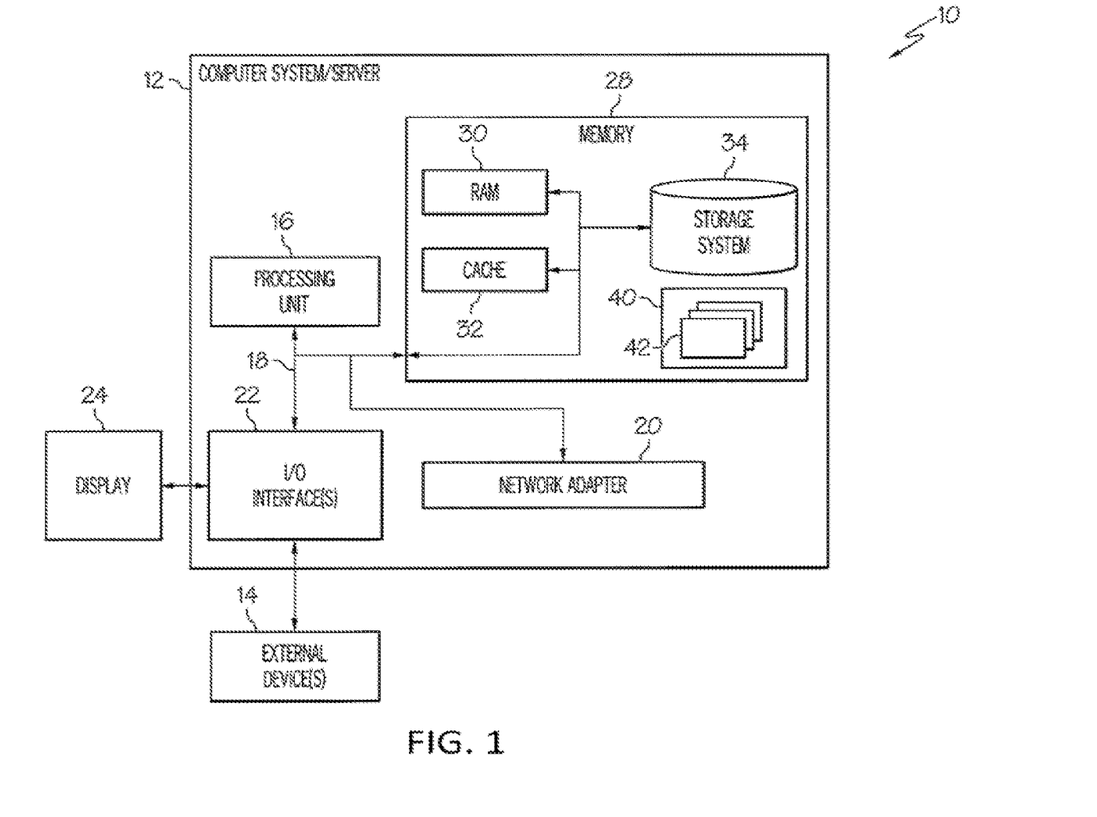
FIG. 1 illustrates a computer system according to an embodiment.

A computer system/server 12 for implementing methods disclosed herein is now discussed with reference to FIG. 1. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
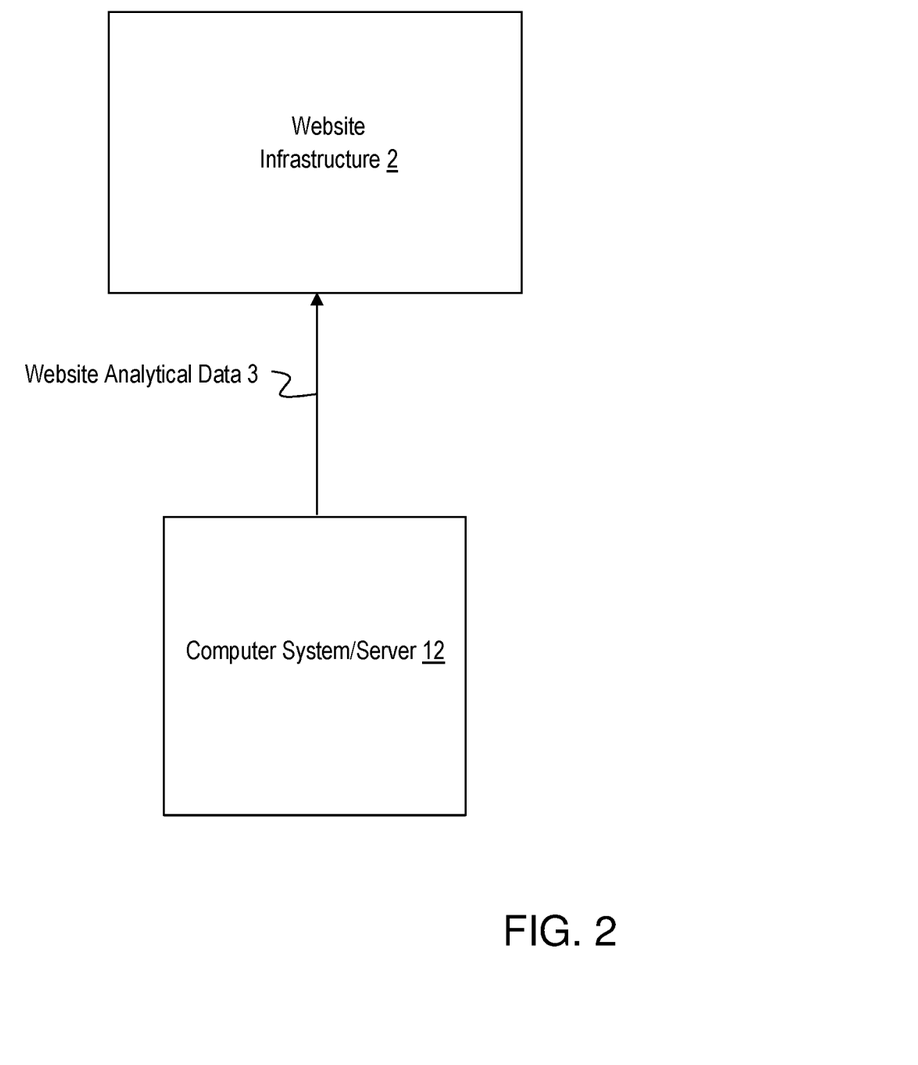
FIG. 2 depicts aspects of receiving website analytical data from a website.

Referring now to FIG. 2, an embodiment of a website infrastructure 2 downloading website analytical data 3 to the computer system/server 12 is depicted. The website infrastructure 2 is configured to provide a website of interest to the internet so that a user or visitor may connect to and interface with the website of interest using the internet. Accordingly, the website infrastructure 2 includes all necessary components, devices and software required to provide the website of interest on the internet. The website infrastructure is also configured to provide website analytical data for each user accessing the website of interest. Non-limiting embodiments of the website analytical data include a source of traffic (i.e., the address of the source from which the user connected to the website of interest), page depth (i.e., the number of pages the user visited on the website of interest), duration (i.e., an amount of time the user spent on the website of interest to include the amount of time spent on each web-page), the next destination (e.g., whether the user clicked on a Live Demo or Trial), a landing page (i.e., the first page the user landed on for the website of interest), and user flow (i.e., do they check or click on several products in addition to an initial product). The website analytical data is provided in a format that can be read and processed by the computer system/server 12.

Figure 3:
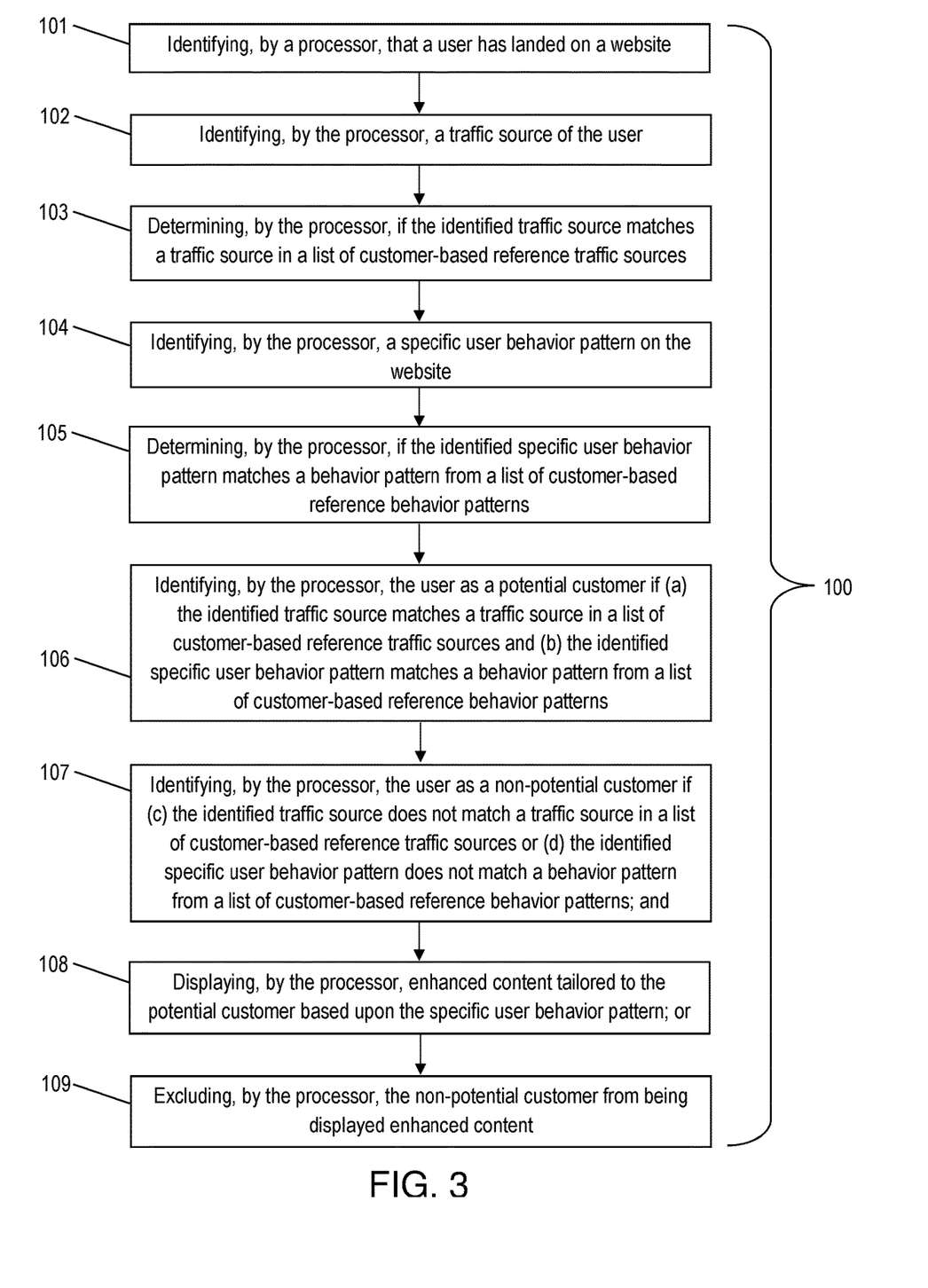
FIG. 3 is a flow chart for a method for identifying a true customer using a website and providing an enhanced experience to the true customer according to an embodiment.

FIG. 3 is a flow chart for a method 100 for identifying a user of a website as a potential customer and presenting the potential customer with enhanced website content. Block 101 calls for identifying that a user has landed on the website. Block 102 calls for identifying a traffic source of the user. Block 103 calls for determining if the identified traffic source matches a traffic source in a list of customer-based reference traffic sources. Non-limiting embodiments of the customer-based reference traffic sources include a search engine or one specific search engine, a response to an email campaign or specific email campaign, a response to a specific paid advertisement such as on broadcast media or magazines, a response to a specific webinar, and a response to a specific live event such as a fair or concert. In general, entries in the customer-based reference traffic sources may be based on website experience from similar types of products. Block 104 calls for identifying a specific user behavior pattern on the website. Block 105 calls for determining if the identified specific user behavior pattern matches a behavior pattern from a list of customer-based reference behavior patterns. Non-limiting embodiments of the customer-based reference behavior patterns include page depth, duration, the next destination on the website, a landing page, referral website, device types, OS (operating system) types, various operation actions such as live chat, watch demo, download, create new applications, deploy the applications, view pricing information, click on contact us button, and user flow or user action flow. Block 105 involves using advanced data science methods on customer prediction based on user behaviors such as using data science nearest neighbor algorithm with a corresponding probability, K-mean algorithm with a corresponding probability, and/or random forest algorithm with a corresponding probability. Block 105 may further involve using predictive models to predict customer behavior. In one or more embodiments, a behavior pattern of the identified potential customer includes spending an amount of time on a particular product page that exceeds a threshold time such as five minutes for example. Block 106 calls for identifying the user as a potential customer if (a) the identified traffic source matches a traffic source in a list of customer-based reference traffic sources and (b) the identified specific user behavior pattern matches a behavior pattern from a list of customer-based reference behavior patterns. Block 107 calls for identifying, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns. Block 108 calls for displaying enhanced content tailored to the potential customer based upon the specific user behavior pattern. The enhanced content relates to additional website content that is not presented to a website user who is not identified as a potential customer. The additional content may include a specific ordering of additional content based upon the specific user behavior pattern. Non-limiting embodiments of the enhanced content include: load the enhanced content differently (to provide more or less information as appropriate depending on previously viewed content); provide a custom routing path to drive the potential customer towards a live product demo or product trial; open a chat window; load a demonstration video window; display other related product advertisements or a summary of already viewed products; provide a recommendation as to what other potential customers did after visiting a particular website page; provide different pricing; and provide an extension for a free trial period. Block 109 calls for excluding, by the processor, the non-potential customer from being displayed enhanced content. Enhanced content in this block refers to any website content that is beyond the normal website content available to any user once the user first accesses the website (e.g., before the method 100 is applied). The term "excluding" may relate to the processor taking positive actions to prevent any enhanced content from being displayed to the non-potential customer. It can be appreciated that in one or more embodiments once a user is identified as a potential customer in block 106, then block 108 may be applied immediately following block 106. Similarly, once a user is identified as a non-potential customer in block 107, then block 109 may be applied immediately following block 107.

The following are examples of improving the user experience once the user is identified as a potential customer. In a first example, when potential customer starts a behavior pattern at one product page and then clicks to view a catalog of other offerings, then a "live chat" or information window pops up showing "the most population that selected product A integrated solution also selected product B" or similar statement. In a second example, when the user is at a "learn more" page for more than five (5) minutes (i.e., an example of a customer-based behavior pattern), additional content will be displayed on the website to engage more with user who is now identified as a potential customer. In a third example, when the user is noted as watching a video, then based on past recorded customer behavior patterns the website loads other most popular videos in such order corresponding to the specific video being viewed.

In one or more embodiments, a potential customer is graded on a scale that indicates how likely the potential customer is to purchase an offering on the website. For example, points may be awarded for each customer-based behavior pattern that the potential customer matches. Some of the behavior patterns may have more points than others depending on the relative importance. The points may be totaled during the potential customer's visit to the website and when a threshold is reached, then a corresponding enhancement may be presented such as a discount to provide motivation for closing a purchase.

It can be appreciated that the system and method for identifying a potential customer may be implemented as a service (paid or otherwise) in a cloud computing environment as discussed in the following paragraphs.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
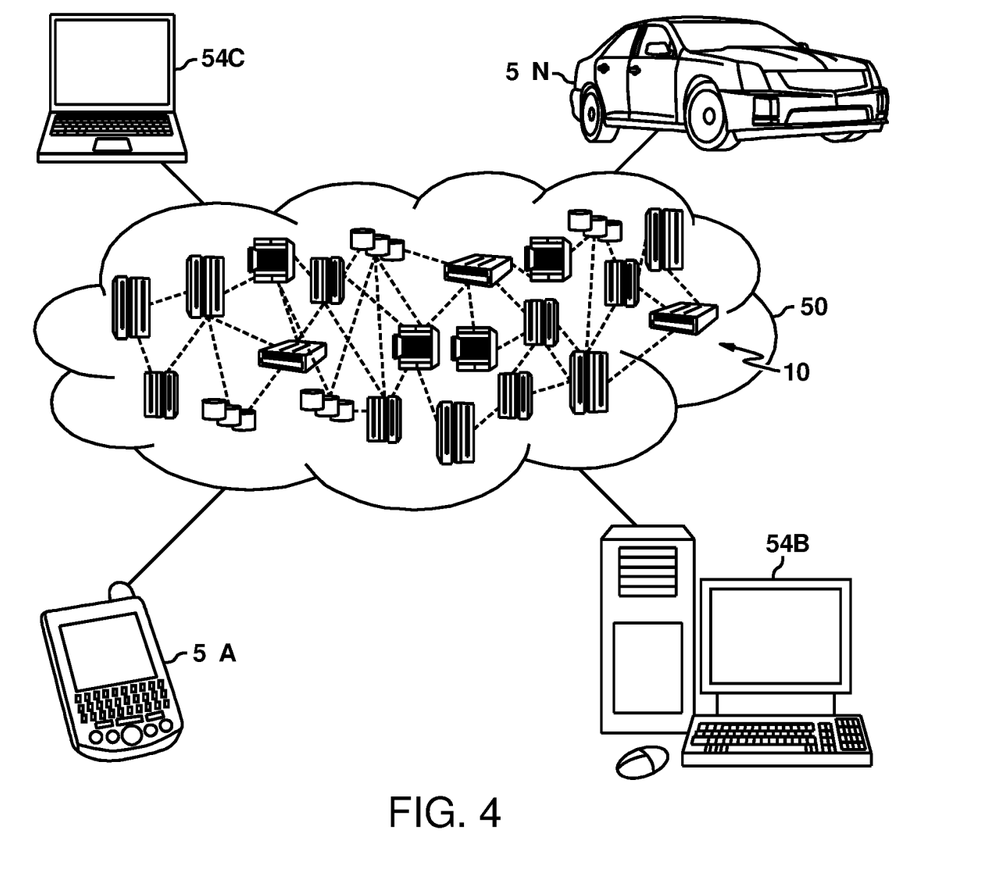
FIG. 4 depicts a cloud computing environment according to an embodiment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
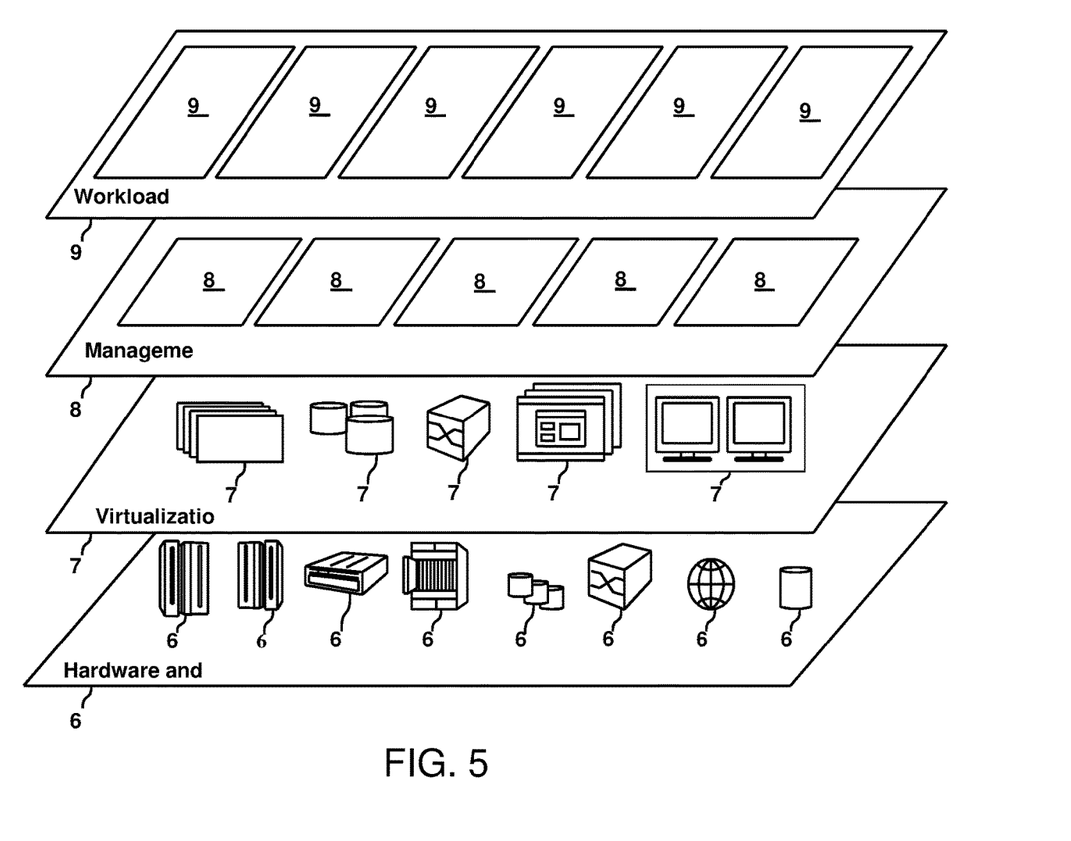
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for identifying users visiting a website as potential customers and providing enhanced content to the potential customers.

Technical effects and benefits include distinguishing between potential customers and other who are not visiting the website to purchase anything. By identifying potential customers and displaying to them enhanced content or custom content based upon their behavior pattern at the website, the likelihood of a potential customer making a purchase is increased.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "configured" relates to one or more structural limitations of a device that are required for the device to perform the function or operation for which the device is configured.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying a user of a website as a potential customer and presenting the potential customer with enhanced website content, the method comprising:
   determining, by a processor, if an identified traffic source of a user that has landed on the website matches a traffic source in a list of customer-based reference traffic sources;
   determining, by the processor, if an identified specific user behavior pattern on the website matches a behavior pattern from a list of customer-based reference behavior patterns;
   identifying, by the processor, the user as a potential customer if (a) the identified traffic source matches a traffic source in a list of customer-based reference traffic sources and (b) the identified specific user behavior pattern matches a behavior pattern from a list of customer-based reference behavior patterns;
   identifying, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and
   displaying, by the processor, enhanced content tailored to the potential customer based upon the specific user behavior pattern; or
   excluding, by the processor, the non-potential customer from being displayed enhanced content.

2. The method according to claim 1, further comprising receiving, by the processor, website analytical data.

3. The method according to claim 1, wherein the list of customer-based reference traffic sources includes at least one of a search engine, a response to an email campaign, a response to a paid advertisement, a response to a webinar, and a response to an event.

4. The method according to claim 1, wherein the list of customer-based reference behavior patterns comprises at least one of page depth, duration, the next destination on the website, a landing page, referral website, device types, operating system types, various operation actions such as live chat, watch demo, download, create new applications, deploy the applications, view pricing information, click on contact us button, user flow or user action flow.

5. The method according to claim 1, wherein the enhanced content comprises at least one of loading the enhanced content differently from non-enhanced content; providing a custom routing path towards a live product demo or product trial; opening a chat window, loading a demonstration video window, displaying other related product advertisements or a summary of already viewed products; providing a recommendation as to what other potential customers did after visiting a particular website page, providing different pricing, and providing an extension for a free trial period.

6. The method according to claim 1, further comprising scoring the potential user with points based upon each customer-based reference behavior pattern matched by the potential customer and displaying enhanced content on the website based on a total number of points scored by the potential customer.

7. The method according to claim 6, wherein the enhanced content is a discount on a product of interest to the potential customer if the total number of points exceeds a threshold value.

8. The method according to claim 1, wherein the method is implemented in a cloud computing environment.

9. The method according to claim 1, further comprising developing the list of customer-based reference behavior patterns based on data science methods and/or predictive models, wherein the data science methods comprise a nearest neighbor algorithm with a corresponding probability, K-mean algorithm with a corresponding probability, and/or a random forest algorithm with a corresponding probability.

10. A system for identifying a user of a website as a potential customer and presenting the potential customer with enhanced website content, the system comprising:
    a memory having computer readable instructions; and
    a processor for executing the computer readable instructions, the computer readable instructions comprising:

determining, by the processor, if an identified traffic source of a user that has landed on the website matches a traffic source in a list of customer-based reference traffic sources;

determining, by the processor, if an identified specific user behavior pattern on the website matches a behavior pattern from a list of customer-based reference behavior patterns;

identifying, by the processor, the user as a potential customer if (a) the identified traffic source matches a traffic source in a list of customer-based reference traffic sources and (b) the identified specific user behavior pattern matches a behavior pattern from a list of customer-based reference behavior patterns;

identifying, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and displaying, by the processor, enhanced content tailored to the potential customer based upon the specific user behavior pattern; or excluding the non-potential customer from being displayed enhanced content.

11. The system according to claim 10, the computer readable instructions further comprising receiving, by the processor, website analytical data.

12. The system according to claim 10, wherein the list of customer-based reference traffic sources includes at least one of a search engine, a response to an email campaign, a response to a paid advertisement, a response to a webinar, and a response to an event.

13. The system according to claim 10, wherein the list of customer-based reference behavior patterns comprises at least one of page depth, duration, the next destination on the website, a landing page, and user flow.

14. The system according to claim 10, wherein the enhanced content comprises at least one of loading the enhanced content differently from non-enhanced content; providing a custom routing path towards a live product demo or product trial; opening a chat window, loading a demonstration video window, displaying other related product advertisements or a summary of already viewed products; providing a recommendation as to what other potential customers did after visiting a particular website page, providing different pricing, and providing an extension for a free trial period.

15. The system according to claim 10, wherein the system is part of a cloud computing environment.

16. A computer program product for identifying a user of a website as a potential customer and presenting the potential customer with enhanced website content, the computer program product comprising a computer readable storage medium having program instructions embodied therewith, the program instructions executable by a processor to cause the processor to:

determine if an identified traffic source of a user that has landed on the website matches a traffic source in a list of customer-based reference traffic sources;

determine if an identified specific user behavior pattern on the website matches a behavior pattern from a list of customer-based reference behavior patterns;

identify the user as a potential customer if (a) the identified traffic source matches a traffic source in a list of customer-based reference traffic sources and (b) the identified specific user behavior pattern matches a behavior pattern from a list of customer-based reference behavior patterns;

identify, by the processor, the user as a non-potential customer if (c) the identified traffic source does not match a traffic source in a list of customer-based reference traffic sources or (d) the identified specific user behavior pattern does not match a behavior pattern from a list of customer-based reference behavior patterns; and display enhanced content tailored to the potential customer based upon the specific user behavior pattern; or exclude the non-potential customer from being displayed enhanced content.

17. The computer program product of claim 16, wherein the program instructions cause the processor to receive website analytical data.

18. The computer program product of claim 16, wherein the list of customer-based reference traffic sources includes at least one of a search engine, a response to an email campaign, a response to a paid advertisement, a response to a webinar, and a response to an event.

19. The computer program product of claim 16, wherein the list of customer-based reference behavior patterns comprises at least one of page depth, duration, the next destination on the website, a landing page, and user flow.

20. The computer program product of claim 16, wherein the enhanced content comprises at least one of loading the enhanced content differently from non-enhanced content; providing a custom routing path towards a live product demo or product trial; opening a chat window, loading a demonstration video window, displaying other related product advertisements or a summary of already viewed products; providing a recommendation as to what other potential customers did after visiting a particular website page, providing different pricing, and providing an extension for a free trial period.

* * * * *